(12) United States Patent
Madduri

(10) Patent No.: US 6,567,830 B1
(45) Date of Patent: May 20, 2003

(54) METHOD, SYSTEM, AND PROGRAM FOR DISPLAYING ADDED TEXT TO AN ELECTRONIC MEDIA FILE

(75) Inventor: Hari Haranath Madduri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/249,203

(22) Filed: Feb. 12, 1999

(51) Int. Cl.[7] .............................................. G06F 17/21
(52) U.S. Cl. ........................................ 707/512; 707/531
(58) Field of Search ................................ 707/512, 531, 707/526; 395/145, 788

(56) References Cited

U.S. PATENT DOCUMENTS

| | | | | |
|---|---|---|---|---|
| 5,146,552 A | * | 9/1992 | Cassorla et al. | 395/145 |
| 5,530,794 A | | 6/1996 | Luebbert | |
| 5,572,656 A | * | 11/1996 | Iida et al. | 395/788 |
| 5,619,738 A | * | 4/1997 | Petruchik et al. | 396/311 |
| 5,732,219 A | | 3/1998 | Blumer et al. | |
| 5,802,380 A | * | 9/1998 | Bangs et al. | 395/777 |
| 6,230,170 B1 | * | 5/2001 | Zellweger et al. | 707/512 |

OTHER PUBLICATIONS

Malcolm, Nicholas and Baines, Brian R., *A Minimalist Approach to the Development of a Word Processor Supporting Group Writing Activities*, Knowledge Science Institute, University of Calgary, Calgary, Alberta, Canada.

Ackerman, Shirley S. and Turechek, William W., *The Risks and Rewards of Online Editing*, IEEE Transactions on processional Communication, vol. 31, No. 3, Sep. 1988.

S. Ackerman, W. Turecheck, and R. Wright, *Online Publication Editing System*, IBM Technical Disclosure Bulletin, vol. 36, No. 06A, Jun. 1993.

Microsoft Office 6–in–1, New Edition, Que Corporation, 1994, pp. 425–428.*

* cited by examiner

Primary Examiner—Stephen S. Hong
(74) Attorney, Agent, or Firm—David W. Victor; Konrad Raynes Victor & Mann LLP

(57) ABSTRACT

Provided are a method, system, and program for receiving and displaying text inserted into a text document. The program displays lines of text from the document and receives user inputted text. The program generates a graphical element to include the user inputted text and generates the user inputted text having a size capable of fitting between two lines of the text from the document. The program then displays the graphical element in the document. The user inputted text within the graphical element is displayed between two lines of text from the document.

35 Claims, 7 Drawing Sheets

12

The preferred embodiments may be implemented as a method, apparatus or article of manufacture using standard programming and/or engineering techniques to produce software, firmware, hardware, or any combination thereof. The term "article of manufacture" (or alternatively, "computer program product" ) as used herein is intended to encompass one or more 110 — in this document and throughout this discussion computer programs and data files accessible from one or more computer-readable devices, carriers, or media, such as a magnetic storage media, "floppy disk" CD ROM, a file server providing access to the programs via a network transmission line, holographic unit, etc. Of 112 — cable line or remote infrared signals course, those skilled in the art will recognize many markings may be made to this configuration without departing from the scope of the invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more 110 — in this document and throughout this discussion computer programs and data files accessible from one or more computer-readable devices, carriers, or media, such as a magnetic storage media, "floppy disk" CD ROM, a file server 112 — cable line or remote infrared signals providing access to the programs via a network transmission line, holographic unit, etc. Of course, those skilled in the art will recognize many markings may be made to this configuration without departing from the scope of the invention.

Fig. 6

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein [in this document and throughout this discussion] is intended to encompass one or more computer programs and data files accessible from one or more computer-readable devices, carriers, or media, such as a magnetic storage media, "floppy disk" CD ROM, a file server providing access to the programs via a network transmission line, holographic unit, etc. [cable line or remote infrared signals] Of course, those skilled in the art will recognize many markings may be made to this configuration without departing from the scope of the invention.

METHOD, SYSTEM, AND PROGRAM FOR DISPLAYING ADDED TEXT TO AN ELECTRONIC MEDIA FILE

CROSS-REFERENCE TO RELATED APPLICATIONS

"Method, System, And Program For Displaying Markings to an Electronic Media File," by Hari Madduri, having U.S. application Ser. No. 09/249,201; and "Method, System, And Program For Storing And Retrieving Markings for Display to an Electronic Media File," by Hari Madduri, having U.S. application Ser. No. 09/249,202.

BACKGROUND OF THE INVENTION

1. Field of the Invention

The present invention relates to a method, system, and program for receiving user inputted text to add to a text document and displaying the added text in the document.

2. Description of the Related Art

In current document editing systems, users typically enter markings and modifications to a document and store such markings and modifications with the document. A marking can be any highlighting, strikeout, line, font change, handwritten indication added to text, underlining, double underline, redline, bold, italics, etc. A highlighting is a thin color film through which the underlying text is visible. For group editing projects, a group member may edit and markup the document and transmit the revised and edited document to another group member for review and further editing. In such group editing environments, groups of users can edit a document on-line by entering textual notes into the document being edited. Such notes are typically entered into pop-up windows which appear in the document. The user may enter textual memos into the pop-up window.

U.S. Pat. No. 5,146,552, entitled "Method for Associating Annotation with Electronically Published Material," which is assigned to International Business Machines Corporation ("IBM"), the assignee of the subject patent application and which is incorporated herein by reference in its entirety, describes a program which allows a user to review and display annotations or notes created by the user or shared and exchanged between users with access to a copy of the same published electronic document. The annotations may be associated with a particular context within the document. Users can review and merge notes from other users, and display such notes with the electronic document.

Many of the current systems for editing and marking-up documents are intended for documents which are read/write capable, thereby allowing the user to make changes directly into the document. However, in many cases, a user may be viewing a document in a read-only format. For instance, a user may be reviewing a Hypertext Mark-Up Language (HTML) document with an HTML browser, e.g., NETSCAPE Communicator, the MICROSOFT Internet Explorer, Spry Mosaic, NCSA Mosaic, Lynx, Opera, GNUscape Navigator et. With such HTML browsers and other viewers for viewing read-only documents, such as the ADOBE Acrobat Reader, users typically cannot directly edit the HTML document while in viewing mode.*

Text editors, such as WORDPERFECT and MICROSOFT WORD, allow users to mark-up and edit a document.* However, with such text editors, the user must save the modified and marked-up file over the original document or save the original and edited document in separate files. If many users are group editing a document, then difficulties may arise tracking the different versions reflecting the mark-ups and edits from different users in the network system.

There is thus a need in the art for an improved system, method, and program for adding text to an electronic media file.

SUMMARY OF THE PREFERRED EMBODIMENTS

To overcome the limitations in the prior art described above, preferred embodiments disclose a method, system, and program for receiving text to add to a displayed text document. The program displays lines of text from the document and receives user inputted text. The program generates a graphical element to include the user inputted text and generates the user inputted text having a size capable of fitting between two lines of the text from the document. The program then displays the graphical element in the document. The user inputted text within the graphical element is displayed between two lines of text from the document.

In further embodiments, a marking file includes information indicating a graphical element including insert text and an addressable location indicating a position of the graphical element in the document. The program processes the marking file to generate the graphical element to superimpose with respect to the addressable location in the document. The program then displays the insert text in the graphical element such that the displayed insert text is displayed between two lines of text in the document.

In preferred embodiments, information on the graphical element is stored in a file separate from the text document. This separate file includes an addressable location of where to position the graphical element, user inputted text, and the generated size of the graphical element and user inputted text.

With preferred embodiments, users may use an enhanced viewer to insert text into a document. This preferred enhanced viewer would generate a graphical element or graphical text box to store the user inputted text. The viewer program would then superimpose the graphical text box or element in the text such that the user inputted text would appear between two lines and the underlying text from the document would appear through another portion of the graphical text box. This allows a user to enter insert text which is then automatically processed and generated to display as inserted between lines within a document.

In further embodiments, information on the generated graphical element, including the user inputted text, is stored in a separate file. In this way, the displayed overlay of the graphical element including the user inserted text onto the underlying document text does not alter the formatting, spacing or content of the electronic media file because information on the inserted text is stored separately from the text document.

Preferred embodiments are particularly applicable to network environments where multiple users may edit a document. Each user may insert text into a document using the viewer program of the preferred embodiments. Later, the file storing the user inserted text may be selected and the viewer program would then superimpose the inserted text onto the displayed document. This allows users in a network to share marking files including insert text to a document without altering the document. A user need only receive the marking file transmitted over a network if the user otherwise has a copy of the associated document to which the markings apply. Further, users may selectively display insert text stored in graphical elements from other people without altering the underlying text document. This allows multiple users to insert text and edit the document without generating multiple versions of the electronic media file throughout the network.

In still further embodiments, users may retrieve marking files from different human editors and associate colors with the different marking files to identify the editor of the markings. In this way, when the user displays graphical elements including insert text and other markings from different marking files, the user can readily identify the source of the marking or insert text based on the color in which the marking or insert text is displayed.

BRIEF DESCRIPTION OF THE DRAWINGS

Referring now to the drawings in which like reference numbers represent corresponding parts throughout:

FIGS. 5 and 6 illustrate how a graphical element may display insert text in accordance with preferred embodiments of the present invention.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Hardware and Software Environment

Figure 1:
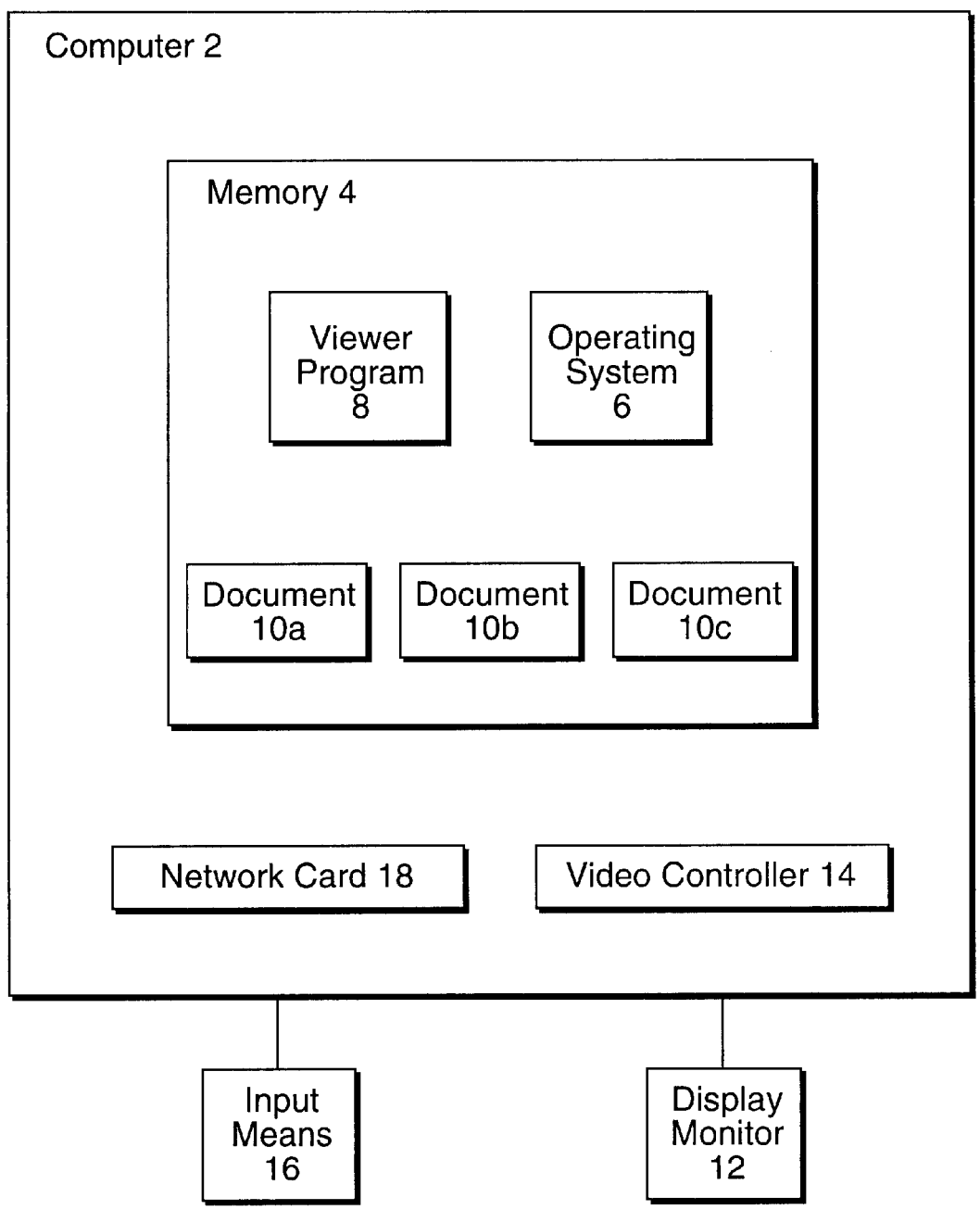
FIG. 1 is a block diagram illustrating a software and hardware environment in which preferred embodiments of the present invention are implemented.

FIG. 1 illustrates a hardware and software environment in which preferred embodiments of the present invention are implemented. A computer 2 includes a memory 4. The computer 2 may be a personal computer, workstation, mainframe, personal digital assistant (PDA), etc., operating under microprocessor control. The memory 4 may be any suitable volatile memory device known in the art, e.g., RAM, DRAM, SRAM, etc., or a combination of volatile and non-volatile memory devices, e.g., hard disk drives, to provide storage space for programs, whether they are being executed or not. If the memory 4 is comprised of volatile and non-volatile memory devices, then data and programs may be swapped between the volatile and non-volatile devices in a manner known in the art.

The memory 4 includes an operating system 6 and a viewer program 8. Certain preferred embodiments are described with respect to electronic media comprised of text.

However, the documents 10a, b, and c including text may also include other electronic media content, such as graphical images, video clips, audio files, etc. In preferred embodiments, the documents 10a, b, and c are in a read only format. The operating system 6 may be any suitable operating system such as AIX®, OS/390™, UNIX, OS/2®, MVS™, WINDOWS, WINDOWS NT, etc.*

A user views and controls computer 2 operations via a display monitor 12, which may be any suitable display device known in the art. The computer 2 includes a video controller 14 to generate display control information and to control the display of data and graphics on the display monitor 12. The video controller 14 may be any suitable graphics card or video controller device known in the art. The computer 2 further includes an input means 16, which may be a keyboard, mouse, pen-stylus, voice activated input, touch-sensitive display screen, etc. Also included is a network card 18 to allow the computer 2 to communicate with other computers over a network, such as TCP/IP, LAN, WAN, ETHERNET, infrared communication means, etc. The network card 18 may be a modem or any other network card interface known in the art to allow the computer 2 to communicate with the network. In preferred embodiments, the computer 2 may communicate with other computers over the network to transfer documents 10a, b, and c. The other computers with which the computer 2 communicates may include the viewer program 8 to view, or view and add, markings in accordance with the preferred embodiments.

In preferred embodiments, a user inputs markings to the document 10a, b, and c while the document is displayed on the display 12. In preferred embodiments, the operating system 6 provides for a windows graphical display environment in which different operating system tasks are executed in different windows. Within the viewer program 8, the user would select, with the input means 16, a document 10a, b, or c to open in the viewer program 8. The selected document 10a, b, or c would be loaded into a volatile memory area of the computer, e.g., a RAM, DRAM, SRAM, etc. The video controller 14 would then generate display control information for document 10a, b, or c to display the electronic media within document 10a, b, or c on the display monitor 12.

When the user selects a marking file to display markings superimposed on the electronic media of the electronic media file, there are at least two possible methods to generate the display control information. With one method, the video controller 14 may generate markings directly into a copy of the document 10a, b, or c maintained in a volatile memory device as a temporary file. Such markings would not be stored in the document 10a, b, or c in non-volatile memory. The video controller 14 would then generate display control information for the modified document (temporary file) maintained in the volatile memory area to display the markings superimposed on the electronic media (text, images, etc.). With a second method, the video controller 14 could generate display control information for the markings and separately display the electronic media and markings on the screen such that the displayed markings are displayed superimposed onto the displayed electronic media. Those skilled in the art will appreciate that there are alternatives ways for a video controller 14 to generate and display data from two separate files.

The Viewer Program

The viewer program 8 includes viewer capabilities to allow the user to view documents 10a, b, or c comprised of multiple types of electronic media. The viewer program 8 includes the viewing capability of browser programs such as HTML browsers, e.g., Netscape Communicator, Microsoft Internet Explorer, etc, and may also include the capability of various add-on programs, such as video players and audio players, to enable the display and processing of different electronic media types. The documents 10a, b, and c (electronic media files) may include text in any text format known in the art, including HTML, ASCII, ANSI, Rich Text Format (RTF), a format specific to a word processor document (e.g., WordPerfect, Microsoft Word) or any other format known in the art for displaying text. The documents 10a, b, and c may also include other media types, such as images, pictures, video clips, sound clips, etc. In such case, the format of the document 10a, b, and c is capable of maintaining address information for multiple electronic media types. The viewer program 8 also includes the capability to allow a user to enter and display markings as superimposed onto the text or images of a displayed document 10a, b, and c, including highlighting of the text or images in different colors, addition of markings, strikeout of text or any modification or editing known in the art. These viewing and marking features are known in the art and included in many types of text editors.

In preferred embodiments, the viewer program 8 would display the document 10a, b, or c content in a single graphical window. Using the input means 16, the user would indicate markings and display such markings directly onto the content of the document 10a, b, c displayed in the window. The user may make markings by selecting or highlighting a particular section of the electronic media (text, image) and then selecting from a displayed menu or tool bar a particular type of marking to apply to the highlighted electronic media, e.g., redlining, strikeout, underlining, italics, bold, etc. Alternatively, the user may make markings by "free-hand" drawing markings using the mouse pointer or pen-stylus.

In preferred embodiments, the markings the user enters with the viewer program 8 are stored in a file separate from the document 10a, b, or c. Thus, the entered markings that are displayed superimposed on the document 10a, b, or c do not alter the format, spacing or content of the underlying document 10a, b, or c because the markings are stored separately. Further, in preferred embodiments, the viewer may be restricted to not allow the user to add markings that would alter the underlying structure of the document 10a, b or c, such as altering the positioning of text within the document. Moreover, because users may input markings to the document 10a, b or c and store the markings separately, a new version of the document is not created each time a user edits or revises the document.

Figure 2:
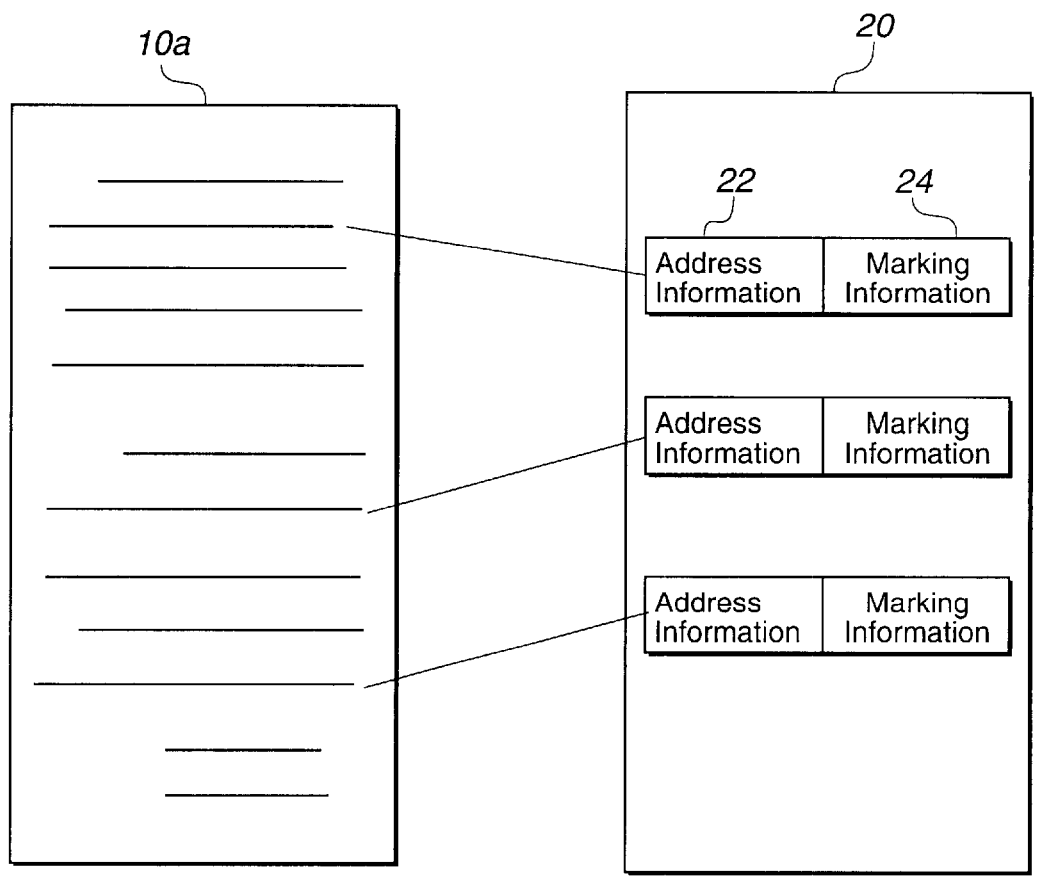
FIG. 2 illustrates the arrangement of a marking file in accordance with preferred embodiments of the present invention.

FIG. 2 illustrates a preferred embodiment of a markings file 20 which stores markings a user makes to a document, e.g., document 10a with the viewer program 8. The markings file 20, which is a separate file from the corresponding document 10a, includes address 22 and marking 24 information. The marking information 24 describes the type of marking made through the viewer program 8. The address information 22 describes the address or position of the described marking in the electronic media within the document 10a. The address information 22 maps the markings 24 to the document. The address information 22 would include information on the addressing context of the document 10a to properly locate the markings described in the modification information 24 to the electronic media, e.g., text, images, in the document 10a. A markings file 20 may include multiple instances or records of address 22 and markings 24 information for each marking and modification made.

The document 10a, b, c may be organized according to any document format or content addressing system known in the art. For instance, if the marked electronic media is text, then the address information 22 may indicate the start and end for the corresponding markings in the text as an offset number from the beginning of the document. Alternatively, text in the documents 10a, b, c may be addressed according to paragraph, wherein the paragraph is the addressable entity and text is addressed according to an offset within an addressable paragraph. In such case, paragraph delimiter information is used to identify the location of text in each paragraph grouping and the application of fonts, margins, and justification are dependent on accurately denoting the end of paragraph for each block of text in a document. If the text in the document 10a was grouped according to paragraphs, then the address information 22 would include such paragraph delimiter information to identify where the modifications apply in the document 10a. Further, documents may be addressed according to levels of objects or other sections. Addressing according to levels of objects permits addressing of non-textual electronic media, such as images. In embodiments where the documents 10a, b, c include non-textual data, such as images or video-clips, the documents 10a, b, c would include a format to address such images and/or video clips and portions therein within the document 10a, b, c.

The markings file 20 would also include document identification information to identify the document 10a, b, c to which the marking file 20 applies. This would prevent a user from applying a markings file 20 to a document that was not the document for which the markings were generated.

As discussed, the viewer program 8 permits any document markings known in the art, including strikeout, highlighting, underlining, double underline, redline, bold, italics, etc. Further, the marking information 24 may describe an annotation note added to the text. Still further, the user may add text to the electronic media. An addition to text is new text superimposed on the underlying text or image within the document 10a, b or c as described below.

The viewer program 8 would further include menu options the user could selectively display in the GUI window in which the viewer program 8 is executing. Such menu options would include a feature to allow the user to retrieve one or more previously stored marking files 20. Upon selecting a marking file 20 for a displayed document, the video controller 14 would generate display control information to superimpose the markings on the text in the document 10a, b, c displayed on the display monitor 12. In preferred embodiments, the user may concurrently superimpose on electronic media markings from multiple marking files.

Preferred embodiments are particularly applicable to reading documents on-line and, in particular, documents, such as on-line books, provided in a read-only format. With the viewer program 8 of the preferred embodiments, the user may display a read only document and create and save markings to the document within the window in which the document is displayed. Users could also use the viewer program to comment upon the appearance or content of an image or video clip. Storing the markings would not modify the actual contents of the document 10a, b, c because the markings are stored separately in the marking file 20. Further, viewers in accordance with preferred embodiments do not allow the user to alter the format or positioning of the text in the underlying document. Preferred embodiments only allow the superimposition of markings over the underlying text.

With preferred embodiments, a user may enter a marking, annotation or addition to text and choose to have the marking to be displayed in a selected color. A user may then transmit the marking file 20 to another user over a network. In this way, a user at a computer 2 may maintain several marking files from different users, wherein the markings of each user are maintained in a different, distinctive color to identify the user that created the markings. A user, using the menu selections displayed in the viewer program 8, may then select the marking files for multiple users. The computer 2 would generate display information to superimpose the markings from multiple marking files from different users over the electronic media within the document 10a, b or c.

When a user selects a marking file to import and superimpose on the document 10a, b or c, in preferred embodiments, the viewer program 8 would display a dialog box on the monitor 12 to allow the user to selectively associate a color with the markings from the selected markings file 20. In preferred embodiments, if there are markings from other marking files already displayed, then the dialog box would present the user colors to select that are not currently being used to display markings. In this way, the same color will not be used to display markings from different marking files. Moreover, when the marking files are generated by different reviewers of the document 10a, b or c, the user can select a color to associate with a particular reviewer when displaying that reviewers markings superimposed on the electronic media of the document 10a, b or c. If the user does not select a particular color to associate with the markings from a selected marking file, then the viewer program 8 may select a default color. The default color may be a color provided by the user who created the marking file or may be a color the viewer program 8 selects in a manner to avoid conflicting with colors already used to display markings.

In further embodiments, the viewer program 8 may only allow the user to select a color to display markings that not only does not conflict with the current colors used to display markings but also does not conflict with the color in which the user is entering markings onto the electronic media. For instance, if the user is marking displayed text in red and the user selects to display the markings from another markings file, then the viewer program 8 would not permit the user to select red to display the markings from the selected marking file. In further embodiments, the viewer program 8 may include an algorithm to determine similar colors that may conflict, such as red or magenta. In such case, the viewer program 8 would not allow the user to select a color that is different yet conflicts with the colors used to display the current markings in the document.

If markings from different users overlap in the displayed document, then the overlapping markings may cause the display of a color that is a combination of the colors of the overlapping markings. For instance, yellow may be used to display editor A's markings and red may be used to display editor B's markings (wherein editor one and editor two's markings are maintained in separate marking files). In such case, superimposing markings from editor A and editor B on the same section of electronic media would display the color formed from the combination of the overlapping marking colors, which in the example would be orange.

The computer 2 may store the combination color formed by superimposing markings from different users into a temporary copy of the document in volatile memory. The video controller 14 may then generate display information from this temporary file including the markings from different users and the content of the electronic media. Alternatively, the video controller 14 may separately display each users markings on the display monitor 12. The natural combined color would form on the display monitor 12 as a result of the display effect of superimposing the display of different colors. Those skilled in the art will appreciate that there are numerous ways to display markings from different users to superimpose overlapping markings and colors resulting from such overlapping markings onto electronic media.

When selecting a marking file to display on the displayed electronic media, the user may select the color used to display the selected markings. In this way, a user can identify colors with particular reviewers that created the markings. The user may also select a color to display overlapping markings from two or more other users. This selected color may differ from the color formed by the combination of the colors associated with the overlapping markings. For instance, if editor A's markings are in yellow and editor B's markings are in red, then the user may select the color green to display overlapping markings from editor A and editor B. The viewer program 8 may further display a legend showing the colors associated with a particular editor and the color associated with overlapping markings from multiple editors.

Users may indicate their own markings by means other than color, such as a displayed pattern of the markings or different fonts or formats, e.g., bold, italics, font size, font type, etc. Moreover, the user may select to block out or not display markings from one or more marking files for selected pages or portions of the underlying text in document 10a, b or c.

Preferred embodiments are particularly useful for allowing a user to view the markings, notes or suggested revisions from different users. Moreover, a user may select markings indicated by the author or creator of the document, a famous critic or other esteemed individual to view how especially insightful people marked-up the document 10a, b or c. If the markings include annotation notes associated with particular locations in the document 10a, b or c, then the user may review the notes others made into the text or image. In group editing environments, the editor may review the suggested modifications of different people and then determine which final revisions to apply based on the received markings.

Because, in preferred embodiments, the marking file 20 is maintained separate from the document, users need only exchange marking files over a network and not the entire document. However, a user that wants to display the markings from a marking file 20 with electronic media from the document 10a, b or c must maintain a copy of the document 10a, b or c to which the marking file applies 20. Otherwise, the user would not be able to display the markings superimposed on the underlying electronic media content as the content is stored separately in the document 10a.

Figure 3:
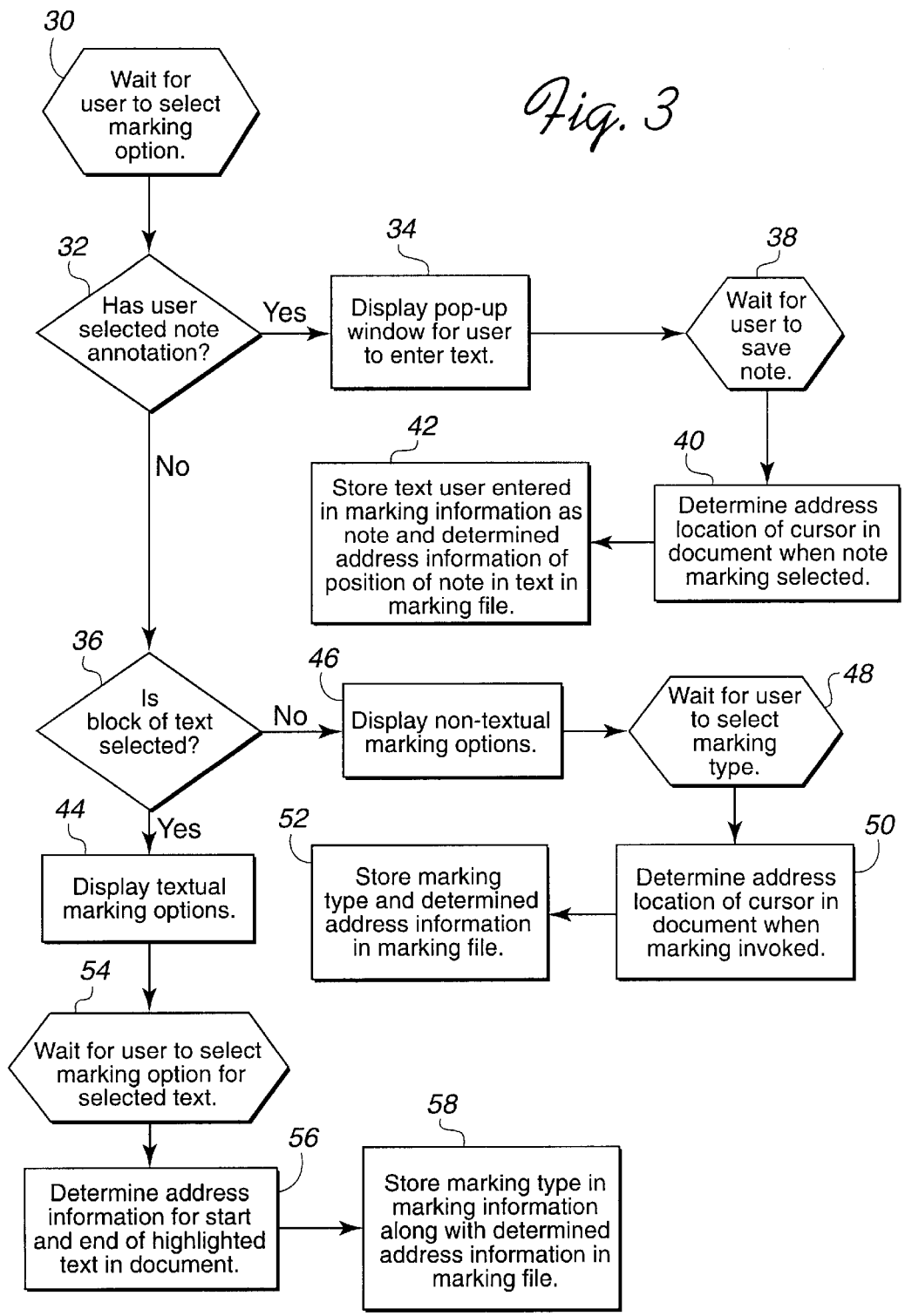
FIG. 3 illustrates program logic to create and store markings in accordance with preferred embodiments of the present invention.
Figure 4:
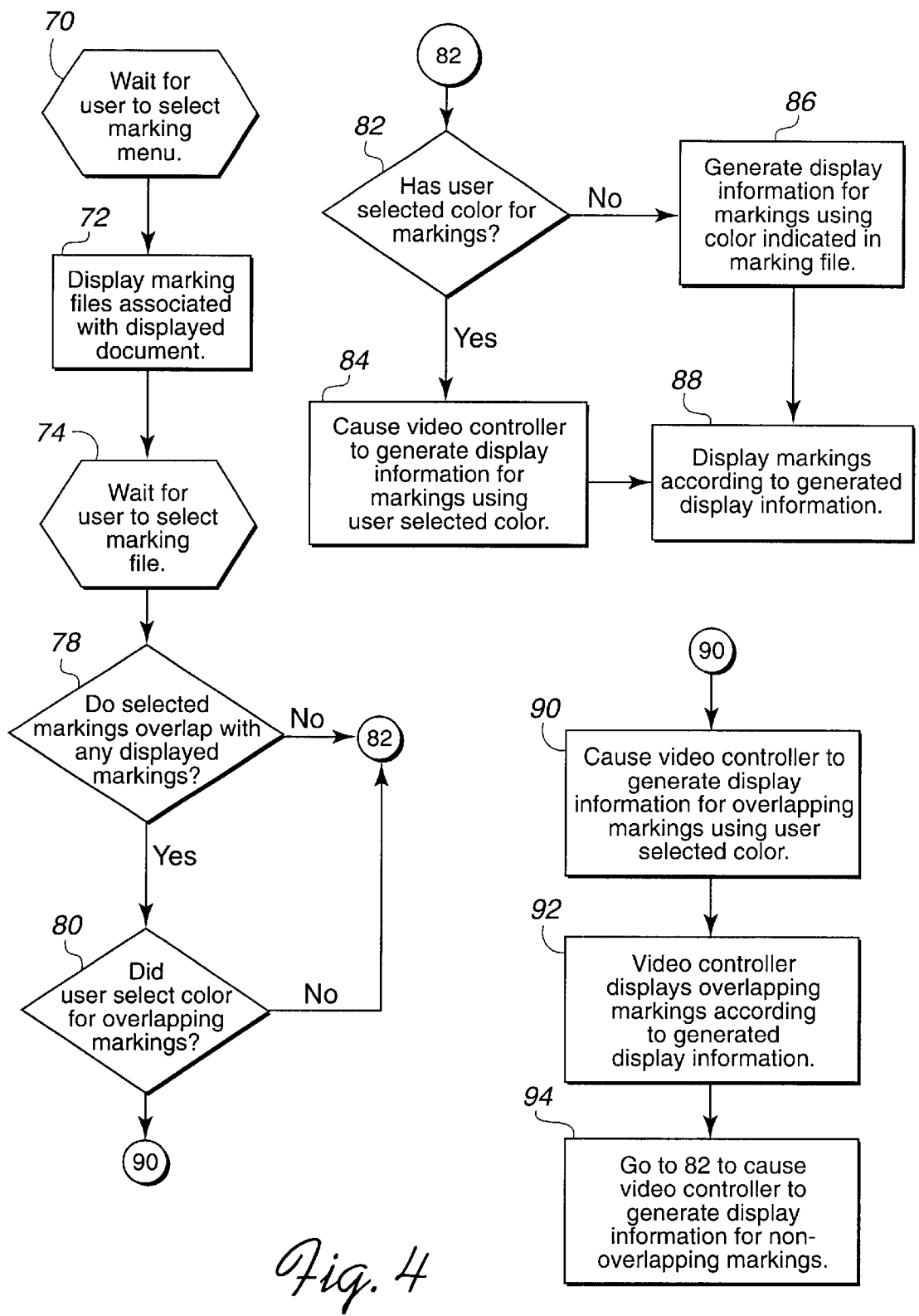
FIG. 4 illustrates program logic to select and display marking files in accordance with preferred embodiments of the present invention.

FIGS. 3 and 4 illustrate logic implemented in the viewer program 8 to process markings to a document 10a, b or c. Control begins at block 30 which represents the viewer program 8 waiting for the user to select a marking option. As discussed, the user may select marking options from a menu bar displayed in the window in which the viewer program 8 is executing. Alternatively, the user may display marking options upon selecting a mouse button or "hot" key from the keyboard input means 16. After the user selects a marking option, control transfers to block 32 where the viewer program 8 determines whether the user has selected the note annotation option to enter annotation text in the document. If so, control transfers to block 34; otherwise, control transfers to block 36. At block 34, the viewer program 8 displays a pop-up window in the window in which the viewer program 8 is executing in which the user may enter annotation text. Control then transfers to block 38 where the viewer program 8 waits for the user to save the note or close the note pop-up window without saving note annotations. If the user closes the pop-up window or note annotation without saving text, then the program would return to block 30 to wait for further user action. Otherwise, control transfers to block 40 where the viewer program 8 determines the address location of a pointer or cursor the user positioned with the input means 16 in the displayed document 10*a, b* or *c* content when the annotation marking feature was invoked. Control then transfers to block 42 where the viewer program 8 stores the annotative text the user entered in the pop-up window in the marking information 24 field and the determined address information of where the marking was made in the electronic media in the address information field 22 of the separate marking file 20.

If the user did not select the note annotation marking feature, then control transfers to block 36 where the viewer program 8 determines whether a block of text in the displayed document is selected, e.g., highlighted with the cursor or pointer. If so, control transfers to block 44; otherwise, control transfers to block 46 where the viewer program 8 displays marking options. The marking options may allow the user to add markup to the location of the cursor or pointer in the document. Alternatively, the user may tag the location of the cursor or pointer to associate a bookmark or tag to the location of the pointer. The marking or tag information would be stored in a separate marking file 20, such that the marking or tagging would not alter the format, spacing or content of the document 10*a* in which the marking is indicated. From block 46, control transfers to block 48 where the viewer program 8 waits for the user to select a marking or tagging option to add to the document 10*a, b* or *c*. After selection, control transfers to block 50 where the viewer program 8 determines the address location of the cursor or pointer in the displayed document when the marking or tagging option was invoked. Control then transfers to block 52 where the viewer program 8 stores the marking tagging type in the marking information 22 field and the determined address location, where the mark or tag was made, in the address information field 24.

If a block of text, such as a plurality of characters, is selected, then at block 44 the viewer program 8 displays marking options that may apply to a block of text, referred to herein as textual marking options, such as highlighting, redlining, strikeout, or other markings to be made to the selected text. Further, a tagging option may be provided to allow the user to tag or bookmark the selected text. The user may select a color for the marking, e.g., a red highlight. Control then transfers to block 54 where the viewer program 8 waits for the user to select a displayed marking option. After the user selects a marking option or tag for the selected text, control transfers to block 56 where the viewer program 8 determines address information for the start and end in the document 10*a, b* or *c* of the highlighted text. Control then transfers to block 58 which represents the viewer program 8 storing the marking type (including color information if selected) in a marking information field 24 along with the determined address information in an address information 22 field.

In this way, a user can enter various markings or tags to a document without altering the actual document. Moreover, because, in preferred embodiments, the markings are stored in a separate marking file 20, the user's markings file can be transmitted to other users for review with the document without generating additional version numbers of the document and without having to transmit the actual document. The underlying marked-up document need not be transferred as long as the user applying the marking file 20 has a copy of the underlying document 10*a, b* or *c* to which the markings apply. This feature reduces network traffic because those groups editing the document do not need to transfer the actual document, which could be quite large, every time they send a copy of their markings to others involved in editing the document.

FIG. 4 illustrates logic implemented in the viewer program 8 to display the markings on the displayed document 10*a, b* or *c*. Control begins at block 70 which represents the viewer program 8 waiting for the user to select the markings menu. Upon selection, control transfers to block 72 which represents the viewer program 8 displaying one or more marking files 20 associated with the document 10*a, b* or *c* being displayed in the active window on the display 12. Control transfers to block 74 where the viewer program 8 waits for the user to select with the input means 16 one of the displayed marking files 20. In preferred embodiments, after the user selects a marking file 20, a dialog box may be displayed in which the user would select a color in which to display the markings form the selected marking file. The markings would then be displayed in the selected color. The user may also be presented with a dialog box in which to select a color to display overlapping markings from separate marking files that mark the same location of electronic media, i.e., the same portion of text or same part of an image.

Control then transfers to block 78 where the viewer program 8 processes the selected marking file to determine whether the selected markings overlap any markings currently displayed in the document 10*a, b, c* displayed on the monitor 12. If so, control transfers to block 80; otherwise control transfers to block 82. At block 82, the viewer program 8 determines whether the user selected a color for the selected markings. If so, control transfers to block 84 to cause the video controller 14 to generate the display control information for the selected markings in the user selected color. Otherwise, control transfers to block 86 to cause the video controller 14 to generate the display control information for the selected markings in the color indicated in the marking information 24 of the marking file 20 or in a default color maintained by the viewer program 8. From blocks 84 or 86, control transfers to block 88 where the video controller 14 displays the markings according to the generated display control information. As discussed, the video controller 14 may generate the display control information and store the display control information in a video memory for display on the display monitor 12. The video controller 14 may generate the display control information to display over any electronic media from the document 10*a, b, c* or markings presently displayed. Alternatively, the viewer program 8 may store the markings directly in a temporary file including the document, and the video controller 14 would generate the display control information from such temporary file.

If the markings from the selected marking file overlap any markings already displayed on the display monitor 12, then control transfers from block 78 to block 80 which represents the viewer program 8 determining whether the user selected a color for the specific overlapping markings. If so, control transfers to block 90; otherwise, control transfers to block 82 to display the markings in the displayed document 10*a, b, c*. The video controller 14 may generate display information to display the markings over the current displayed document, including any currently displayed markings. In such case, any markings from the selected marking file will be displayed as directly superimposed over the displayed electronic media, including markings from other marking files. To the extent the superimposed markings are in one color and the displayed electronic media (including other markings) that overlap the location of the selected markings are in another color, a color that is a natural combination of the overlapping marking colors will be displayed. If the user selected a specific overlap color for the overlapping markings, then control transfers to block 90 to cause the video controller 14 to generate display information for the overlapping markings in the user selected overlap color. Control transfers to block 92 where the video controller 14 displays the overlapping markings according to the display control information. Control then transfers to block 94 which represents the viewer program 8 proceeding to block 72 to cause the video controller 14 to generate display control information to display the non-overlapping markings.

With preferred embodiments, a user can select markings created by multiple users to display over the document displayed on the display monitor 12. In this way, the user can view markings, comments or highlighting of the electronic media from different users with access to the underlying document 10*a, b* or *c*. Further as discussed, with preferred embodiments, the user can select desired color schemes for any markings in a file and for specific overlapping marking combinations. Because the user can manipulate markings without altering the underlying document, only one version of the underlying document need be maintained by each user reviewing the markings.

Adding Text to the Displayed Electronic Media File

In certain instances, users may want to add text above a line of text displayed in the document 10*a, b* or *c*. Preferred embodiments include a feature to allow the user to insert text above a line of text in the displayed document 10*a, b* or *c*, in between two lines of text displayed in the underlying document 10*a, b* or *c*. This is accomplished by the viewer program 8 generating a graphical text box in which the user may enter text. This graphical box, which appears as a transparent film superimposed on the text in the document 10*a, b* or *c*, is displayed at an addressable location within the document.

FIGS. 5 and 6 illustrate embodiments showing how the graphical text box may be displayed as a transparent film or label inserted at places within the document to add text. FIG. 5 illustrates text displayed from an electronic file 10*a, b* or *c* on display monitor 12. The user has inserted text which is maintained in graphical text boxes 110 and 112 for display in the document 10*a, b* or *c*. To insert text, the user selects an addressable location within the text in the document 10*a, b* or *c*. The viewer program 8 then displays a graphical text box in which the user enters text. The viewer program 8 superimposes the graphical text box 110, 112 over the underlying text such that the lower left corner of the graphical text is at the addressable location in the underlying text where the user selected the option to insert or add text. The user may then insert the added text using the keyboard or pen stylus to be displayed in the upper half of the film above the underlying text displayed through the lower half of the transparent film. In preferred embodiments, the graphical text box is displayed as a transparent film such that underlying text in the document displays through the lower portion of the graphical text box superimposed thereon.

FIG. 6 illustrates an alternative embodiment in which the graphical element, shown as 114 and 116, are positioned between the lines of text. With FIG. 6, the lower left corner of the graphical text element 114 and 116 is positioned between the lines of text. In this way, the graphical text element 114 and 116 is positioned at a vertical offset from the addressable location in the underlying text where the user selected the option to insert or add text. This vertical offset locates the graphical text element 114 and 116 between lines of text in the underlying text.

The information to generate the transparent graphical text box with respect to the underlying text is stored in the marking file 20. The address information 22 would indicate the addressable location in the underlying text in document 10*a, b* or *c* where the user indicated to add the text. In the case of the embodiments of FIG. 5, this addressable location is where the lower left corner of the transparent film graphical text element is positioned. In the case of the embodiments of FIG. 6, vertical offset information is also maintained in the marking file 20 for use in positioning the graphical text element 114 and 116 at a vertical offset from the addressable location selected by the user, between two lines of text. The marking information 24 would indicate the dimensions of the graphical text box and the text the user entered to be displayed in the upper half of the graphical text box. When the marking file 20 is selected, the viewer program 8 would generate any graphical text boxes 110, 112, 114, and 116 in the marking file 20 to superimpose in the document 10*a, b* or *c*.

The graphical text boxes 110, 112, 114, and 116 shown in FIGS. 5 and 6 are bordered by dashed lines. In preferred embodiments, the transparent graphical text box would be displayed without any dashed lines so all that would be viewed would be the inserted text superimposed between the lines of underlying text. In the embodiments of FIG. 6, the underlying text is displayed through the lower half of the transparent graphical text boxes 110 and 112 and the inserted text the user entered would be displayed in the upper half of the graphical text box 10 and 112, displayed between the lines. In alternative embodiments, the user may select to display lines around the graphical text box 110 and 112 or shade the graphical text box 110 and 112 box. Further, the user may select to have a carrot or other marking superimposed on the underlying text, such as the case with graphical text elements 110 and 114, wherein the carrot marking identifies where to insert the added text in the underlying document. Alternatively, the graphical text element may be displayed without any location marking, such as the case with graphical text elements 112 and 116.

Figure 7:
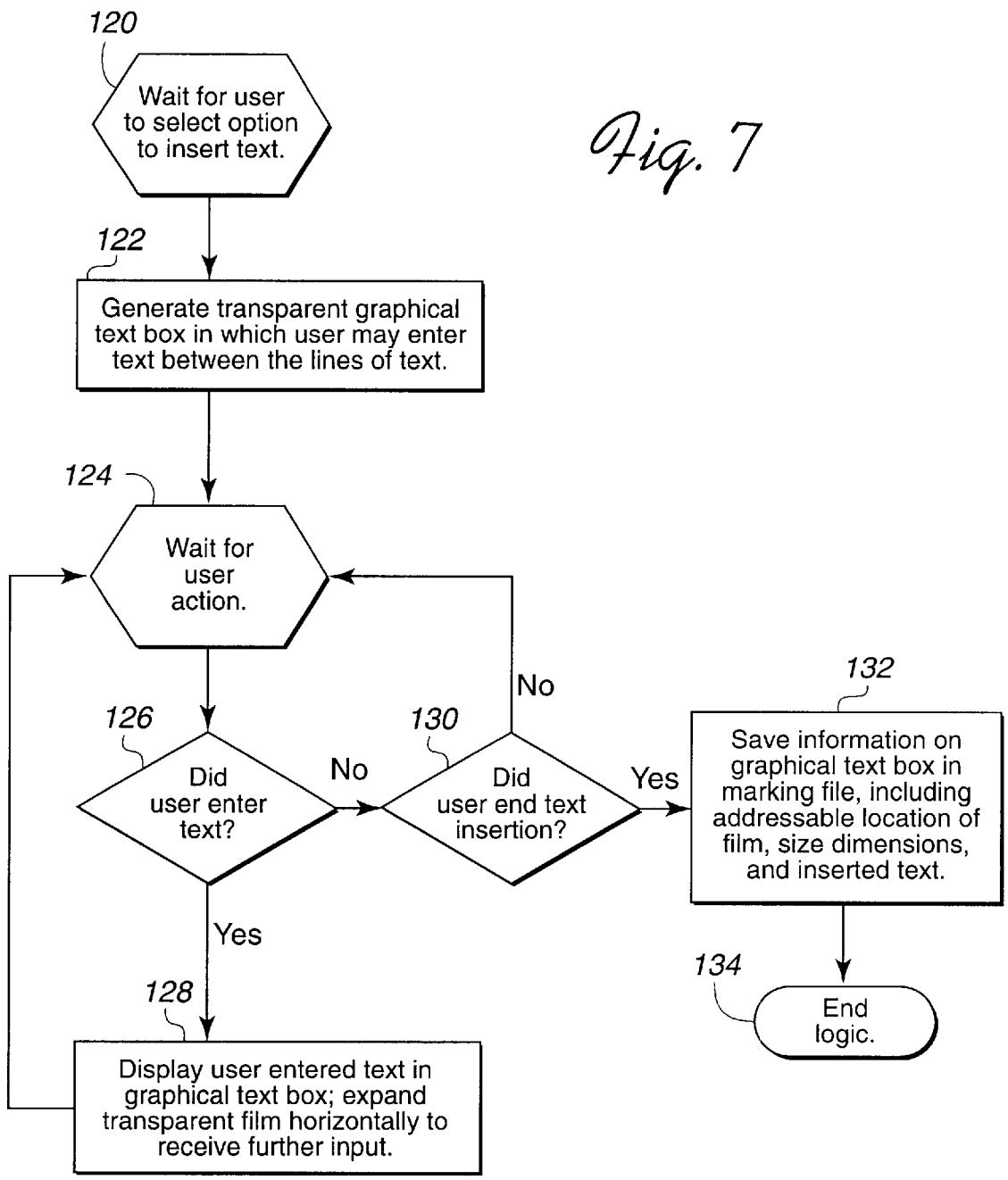
FIG. 7 illustrates logic to receive and process user insert text in accordance with preferred embodiments of the present invention.

FIG. 7 illustrates logic implemented in the viewer program 8 to allow the user to insert text. Control begins at block 120 where the viewer program 8 waits for the user to select, using the input means 16, the option to insert text. At this point, the user's cursor is preferably at an addressable location within the text. This may occur at blocks 48 or 54 in FIG. 3. Control then transfers to block 122 (FIG. 6) where the viewer program 8 generates the graphical text box in the document. Initially, before any text is entered, the graphical text box may have no width and consist of a blinking cursor. Control then transfers to block 124 to await user action. Upon user action, control transfers to block 126 where the viewer program 8 determines whether the user entered text. If so, control transfers to block 128 to display the user entered text in the graphical text box. When displaying the user entered text, the viewer program 8 will size the entered text, and if necessary determine a smaller font size, such that the entered text is positioned above the line of underlying text where the cursor is positioned, but below the line of text directly above. The viewer program 8 may then expand the graphical text box 110, 112, 114 or 116 horizontally to provide more space in the graphical text box for the user to enter further text. In alternative embodiments, the viewer program 8 may display the graphical text box without a blinking cursor to allow the user to enter text with a pen stylus to add to the upper half of the graphical text box, above the underlying text displayed in the lower half of the graphical text box.

In the embodiments of FIG. 5, the graphical text boxes 110 and 112 display the user entered text in the upper half of the box, between the lines of underlying text, and the underlying text is displayed through the lower half of the transparent graphical text boxes 110 and 112.

From block 128, control transfers back to block 124 to await further user input. If, at block 126, the user did not enter text, then control transfers to block 130 to determine whether the user selected to end text insertion. If so, control transfers to block 132; otherwise, control transfers back to block 124 to wait for the user to select a recognizable action. At block 132, the viewer program 8 saves the information on the graphical text box including inserted text in the marking file 20. In preferred embodiments, the viewer program 8 would save the addressable location of the underlying text where the user pointing device, e.g., mouse pointer or cursor, was located when the user invoked the text insert option. With the graphical text boxes 110 and 112 in the embodiment of FIG. 5, the saved address information would be used to determine where to display the lower left corner of the transparent graphical text box 110 or 112. With the embodiment of FIG. 6, the saved address information would further include a vertical offset, such that the graphical text box 114 or 116 would be displayed at a position that is a vertical offset from the saved addressable location in the underlying text. In the marking information 24, the viewer program 8 would save information on the dimensions of the graphical text box 110, 112, the font details (size, bold, type, etc.) of the entered text, and the entered text. From this saved information, the viewer program 8 would be able to generate for display the graphical text box 110, 112, 114 or 116. After saving the information on the graphical text box 110, 112, 114 or 116, control transfers to block 134 to end the text insertion logic.

In further embodiments, the user may invoke the insert text option when text is selected, e.g., highlighted. In such case, in addition to entering text, the user may select marking options to perform with respect to the selected text. For instance, the user may strikeout or highlight the selected text. Such markings may be stored separately in the marking file 20 as discussed with respect to FIGS. 4 and 5. In the embodiments of FIG. 5, markings to the text may be displayed in the lower half of the graphical text box to superimpose over the selected underlying text. For example, the strikeout may be displayed within the lower half of graphical text box 112, such that when the graphical text box 112 is displayed as superimposed over the underlying text, the strikeout within the graphical text box 112 is displayed over the selected underlying text.

In preferred embodiments, the graphical text boxes 110, 112, 114 and 116 would be displayed in a color corresponding to a color the user selectively associated with the marking file 20 including the transparent graphical text boxes. With respect to the embodiments of FIG. 5, the viewer program 8 may only display the upper half of the graphical text boxes 110 and 112 in the color associated with the marking file 20 including such inserted text. In this way, only the inserted text would appear in the color and the underlying text in the lower half of the graphical text box 110 and 112 would not appear in the color associated with the marking file including the inserted text, and would appear unaffected by the graphical text box 110 and 112. Further, to the extent other markings were made to the underlying text and displayed in a color superimposed on the text, then those colored markings to the underlying text would appear through the lower half of the graphical text box 110 and 112 in a manner that would not alter the color of the underlying text and any other markings superimposed thereon. For instance, if markings from one marking file superimposed blue strikeouts on the underlying text and another marking file superimposed a transparent graphical text box adding text in yellow, then the strikeout would appear as blue over the underlying text and the added text would appear yellow above the line of striked-out text.

In certain embodiments, the graphical text boxes 110, 112, 114, and 116 and the graphical interface of the viewer program 8 may be implemented using the Java* Foundation Classes, including the Java Swing Components. Using Java Swing Components, the graphical text boxes may be implemented as Swing text components. In further embodiments, the graphical box may be a graphical element having a shape other than a box that is capable of being transparent and displaying user inputted text in the document. Moreover, if the graphical element has shapes different from a box, then the user inputted text and underlying text may be displayed with respect to different portions of the graphical element, other than described with respect to text boxes 110, 112, 114, and 116.

In further embodiments, after transparent graphical text boxes are superimposed on the document 10a, b or c, the user may, using the input means 16, move the graphical text box around the display 12 to other, preferably blank, areas of the underlying text document. When moving the graphical text box, the user would expose the area previously covered by the moved graphical text box. In further embodiments, if the user were to deselect the moved graphical text box, the graphical text box may then return, like an elastic band, back to the original addressable location of the transparent graphical text box, before the box was moved. This feature allows the user to move the inserted text box to a "white" or blank area of the underlying document to view without interfering text or markings.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many changes may be made to this configuration without departing from the scope of the present invention.

The computer 2, operating system 6, viewer program 8, and video controller 14 were described as separate components in preferred embodiments. However, in alternative embodiments, any one of the functions described as being performed by any one or combination of components 2, 6, 8, and 14 may be performed by another component 2, 6, 8 or 14, or combination thereof.

In preferred embodiments, the logic of FIGS. 3 and 4 is implemented as software logic in the viewer program 8. Certain of the logic, such as the logic for generating display control information, may be implemented in the viewer program 8 and/or the video controller 14, or in other hardwired or softwired logic within the computer 2. Moreover, certain of the logic described as being implemented in the video controller 14 may be implemented in the viewer program 8 or elsewhere in the computer 2. The preferred logic of FIGS. 3 and 4 is for illustrative purposes, such that steps may be added, removed, and the sequence of steps changed.

The format of the document may be capable of addressing numerous types of electronic media within a document 10*a, b, c*, including text, images video clips, audio, etc. In such case, the marking file would include address information to address the location of particular markings to an image, video clip, or audio clip. For instance, an input device, such as a pen-stylus, mouse, touch sensitive screen, joystick, etc., may be used to make markings to a displayed image or video clip frame. In such case, the address information could address a particular location within the image or a location within an image within a frame of a video clip. For instance, various graphic programs, such as Microsoft Paint, allow a user to enter and store markings in different colors onto an imported image. Preferred embodiments would save the markings along with address information mapping the markings to the image in a file separate from the image.

Preferred embodiments were described as storing the markings in a file separate from the document to which the markings apply to avoid altering the format, spacing or content of the underlying document. In alternative embodiments, the markings may be stored in the same file as the underlying document in a manner that does not alter the format, spacing or content of the underlying document. For instance, the marking file 20 may be stored as an object within the file in which the underlying document is stored in such a manner that the marking object will not alter the underlying document. In this way, the marking object is a module of the document that may be invoked and superimposed onto the content of the underlying document without ever altering the content of the underlying document to which the markings were applied.

A non-textual marking, such as a sound (beep or other noise) may be made to an audio clip to sound when the marked portion of the audio clip is played. Alternatively, a pop-up window including annotative text may be displayed when a particular section of the audio file is played. Those skilled in the art will appreciate that there are numerous ways to address locations within an image, video clip, audio file or other electronic media types for the purpose of positioning markings that are maintained in a file separate from the underlying electronic media being marked. media from the electronic media file on the monitor.

Preferred embodiments were described with respect to displaying markings in color and combinations of colors superimposed onto text. However, in alternative embodiments, the colored markings and multiple markings of different colors forming combined colors may be superimposed on an image, such as a graphical image or video clip. In such case, the color of the superimposed color marking may be affected by the coloring of the underlying image to which the marking applies.

In summary, preferred embodiments in accordance with the present invention disclose a method, system, and program for receiving text to add to a displayed text document. The program displays lines of text from the document and receives user inputted text. The program generates a graphical element to include the user inputted text and generates the user inputted text having a size capable of fitting between two lines of the text from the document. The program then displays the graphical element in the document. The user inputted text within the graphical element is displayed between two lines of text from the document.

The foregoing description of the preferred embodiments of the invention has been presented for the purposes of illustration and description. It is not intended to be exhaustive or to limit the invention to the precise form disclosed. Many markings and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

*NETSCAPE is a registered trademark of the Netscape Communications Corporation; MICROSOFT is a registered trademark of Microsoft Corporation; ADOBE is a registered trademark of Adobe Systems Incorporated; WORDPERFECT is a registered trademark of the Corel Corporation; AIX, OS/390, MVS, and OS/2 are trademarks of IBM; WINDOWS and WINDOWS NT are registered trademarks of Microsoft Corporation; UNIX is a registered trademark licensed by the X/Open Company LTD; JAVA is a registered trademark of Sun Microsystems Corporation.

What is claimed is:

1. A method for receiving text to add to a displayed text document, comprising the steps of:

displaying lines of text from the document;

receiving a user selected addressable location to insert text in the document and user selection of a text editing option to enter text;

in response to receiving selection of the text editing option, generating a graphical element to include the user inputted text while the user is entering text, wherein the graphical element is displayed in the document with respect to the selected addressable location;

receiving user inputted text;

generating the graphical element including the user inputted text having a size capable of fitting between two lines of the text from the document; and displaying the graphical element in the document while the user is entering text that appears in the graphical element, wherein the user inputted text within the graphical element is displayed between two lines of text from the document.

2. The method of claim 1, wherein the step of generating the graphical element comprises generating the graphical element to have a size capable of being positioned between two lines of the text from the document.

3. The method of claim 1, wherein the step of generating the graphical element comprises generating the graphical element such that a first portion of the graphical element is capable of being superimposed over the text in the document and a second portion of the graphical element is capable of displaying the user inputted text, and wherein the step of displaying the graphical element comprises displaying the first portion of the graphical element as superimposed on the text in the document such that text in the document displays through the first portion of the displayed graphical element and displaying the second portion such that the user inputted text is displayed between two lines of text from the document.

4. The method of claim 3, further comprising the steps of:
receiving user input indicating markings to the text in the document on which the first portion of the graphical element is superimposed; and
displaying the markings superimposed on the text through the first portion of the graphical element.

5. The method of claim 1, further comprising the step of storing information on the graphical element in a file separate from the document, including an addressable location of where to position the graphical element, the user inputted text, and the generated size of the graphical element.

6. The method of claim 3, wherein the graphical element is a graphical text box, wherein the lower left corner of the graphical text box is displayed at the selected addressable location, and wherein the first portion is a lower half of the graphical text box and the second portion is an upper half of the graphical text box.

7. The method of claim 1, wherein the graphical element is a graphical text box, and wherein the graphical element is displayed at a vertical offset from the selected addressable location.

8. A method for displaying text to insert into a displayed text document, comprising the steps of:
displaying lines of text from a document;
providing at least one marking file including information indicating a graphical clement including insert text and an addressable location indicating a position of the graphical element in the document, wherein the marking file is created in response to a user selecting an editing option and the addressable location to enter text between the displayed lines of text in the document at the selected addressable location;
processing the marking file to generate the graphical element to superimpose with respect to the addressable location in the document; and
displaying the insert text in the graphical element, wherein the displayed insert text is displayed between two lines of text in the document.

9. The method of claim 8, wherein the generated graphical element has a size such that a first portion of the graphical element is superimposed over the text in the document and a second portion of the graphical element is superimposed between two lines of text, wherein the text in the document is displayed through the first portion of the displayed graphical element, and wherein the insert text is displayed in the second portion of the graphical element between two lines of text in the document.

10. The method of claim 8, wherein the graphical element is displayed at a vertical offset with respect to the addressable location, such that the graphical element is positioned between two lines of text and the insert text is displayed between two lines of text.

11. The method of claim 8, further comprising the steps of:
receiving color input indicating a color in which to display the markings in the marking file; and
displaying the graphical element in the color indicated in the color input, wherein the insert text appears in the color.

12. The method of claim 11, wherein the selected marking file including the graphical element is a first marking file and the color is a first color, further comprising the steps of:
receiving selection of a second marking file including markings to the text in the document;
receiving color input indicating a second color in which to display the markings in the second marking file; and
superimposing markings from the second marking file on text from the document.

13. The method of claim 8, wherein the addressable location is a first addressable location, further comprising the steps of:
receiving user input to move the graphical element to a second addressable location in the document;
displaying the graphical element as moving to the second addressable location, wherein the graphical element and insert text therein is displayed superimposed at the second addressable location;
receiving user input deselecting the graphical element; and
displaying the return of the graphical element to the first addressable location.

14. A system for receiving text to add to a displayed text document, comprising:
means for displaying lines of text from the document;
means for receiving a user selected addressable location to insert text in the document and user selection of a text editing option to enter text;
means for generating a graphical element to include the user inputted text while the user is entering text in response to receiving selection of the text editing option, wherein the graphical element is displayed in the document with respect to the selected addressable location;
means for receiving use inputted text;
means for generating the graphical element including the user inputted text having a size capable of fitting between two lines of the text from the document; and
means for displaying the graphical element in the document while the user is entering text that appears in the graphical element, wherein the user inputted text within the graphical element is displayed between two lines of text from the document.

15. The system of claim 14, further comprising:
a computer, wherein the means are implemented as program logic within the computer;
user input means for entering data into the computer;
a display monitor for displaying data from the computer; and
a memory accessible to the computer including the text document.

16. The system of claim 14, further comprising means for generating the graphical element to have a size capable of being positioned between two lines of the text from the document.

17. The system of claim 14, further comprising means for generating the graphical element such that a first portion of the graphical element is capable of being superimposed over the text in the document and a second portion of the graphical element is capable of displaying the user inputted text, and wherein the step of displaying the graphical element comprises displaying the first portion of the graphical element as superimposed on the text in the document such that text in the document displays through the first portion of the displayed graphical element and displaying the second portion such that the user inputted text is displayed between two lines of text from the document.

18. The system of claim 14, further comprising means for storing information on the graphical element in a file separate from the document, including an addressable location of where to position the graphical element, the user inputted text, and the generated size of the graphical element.

19. A system for displaying text to insert into a displayed text document, comprising;

means for displaying lines of text from a document;

means for providing at least one marking file including information indicating a graphical element including insert text and an addressable location indicating a position of the graphical element in the document, wherein the marking file is created in response to a user selecting an editing option and the addressable location to enter text between the displayed lines of text in the document at the selected addressable location;

means for processing the marking file to generate the graphical element to superimpose with respect to the addressable location in the document; and means for displaying the insert text in the graphical element, wherein the displayed insert text is displayed between two lines of text in the document.

20. The system of claim 19, further comprising:

means for receiving color input indicating a color in which to display the markings in the marking file; and means for displaying the graphical element in the color indicated in the color input, wherein the insert text appears in the color.

21. The system of claim 20, wherein the selected marking file including the graphical element is a first marking file and the color is a first color, further comprising:

means for receiving selection of a second marking file including markings to the text in the document;

means for receiving color input indicating a second color in which to display the markings in the second marking file; and means for superimposing markings from the second marking file on text from the document.

22. The system of claim 19, wherein the addressable location is a first addressable location, further comprising:

means for receiving user input to move the graphical element to a second addressable location in the document;

means for displaying the graphical element as moving to the second addressable location, wherein the graphical element and insert text therein is displayed superimposed at the second addressable location;

means for receiving user input deselecting the graphical element; and means for displaying the return of the graphical element to the first addressable location.

23. An article of manufacture for use in program computer system to receive text to add to a displayed text document displayed on a display monitor in communication with the computer system, the article of manufacture comprising a computer program in a computer useable medium accessible to the computer system, wherein the computer program is capable of causing the computer system to perform the steps of:

displaying lines of text from the document;

receiving a user selected addressable location to insert text in the document and user selection of a text editing option to enter text;

in response to receiving selection of the text editing option, generating a graphical element to include the user inputted text while the user is entering text, wherein the graphical element is displayed in the document with respect to the selected addressable location;

receiving user inputted text;

generating the graphical element including the user inputted text having a size capable of fitting between two lines of the text from the document; and displaying the graphical element in the document while the user is entering text that appears in the graphical element, wherein the user inputted text within the graphical element is displayed between two lines of text from the document.

24. The article of manufacture of claim 23, wherein the step of generating the graphical element comprises generating the graphical element to have a size capable of being positioned between two lines of the text from the document.

25. The article of manufacture of claim 23, wherein the step of generating the graphical element comprises generating the graphical element such that a first portion of the graphical element is capable of being superimposed over the text in the document and a second portion of the graphical element is capable of displaying the user inputted text, and wherein the step of displaying the graphical element comprises displaying the first portion of the graphical element as superimposed on the text in the document such that text in the document displays through the first portion of the displayed graphical element and displaying the second portion such that the user inputted text is displayed between two lines of text from the document.

26. The article of manufacture of claim 25, wherein the computer program is further capable of causing the computer to perform the steps of:

receiving user input indicating markings to the text in the document on which the first portion of the graphical element is superimposed; and displaying the markings superimposed on the text through the first portion of the graphical element.

27. The article of manufacture of claim 23, wherein the computer program is further capable of causing the computer to perform the step of storing information on the graphical element in a file separate from the document, including an addressable location of where to position the graphical element, the user inputted text, and the generated size of the graphical element.

28. The article of manufacture of claim 25, wherein the graphical element is a graphical text box, wherein the lower left corner of the graphical text box is displayed at the selected addressable location, and wherein the first portion is a lower half of the graphical text box and the second portion is an upper half of the graphical text box.

29. The article of manufacture of claim 23, wherein the graphical element is a graphical text box, and wherein the graphical element is displayed at a vertical offset from the selected addressable location.

30. An article of manufacture for use in program computer system to insert text into a text document displayed on a display monitor in communication with the computer system, the article of manufacture comprising a computer program in a computer useable medium accessible to the computer system, wherein the computer program is capable of causing the computer system to perform the steps of:

displaying lines of text perform a text document;

providing at least one marlding file including information indicating a graphical element including insert text and an addressable location indicating a position of the graphical element in the document, wherein the marking file is created in response to a user selecting an editing option and the addressable location to enter text between the displayed lines of text in the document at the selected addressable location;

processing the marking file to generate the graphical element to superimpose with respect to the addressable location in the document; and displaying the insert text in the graphical element, wherein the displayed insert text is displayed between two lines of text in the document.

31. The article of manufacture of claim 30, wherein the generated graphical element has a size such that a first portion of the graphical element is superimposed over the text in the document and a second portion of the graphical element is superimposed between two lines of text, wherein the text in the document is displayed through the first portion of the displayed graphical element, and wherein the insert text is displayed in the second portion of the graphical element between two lines of text in the document.

32. The article of manufacture of claim 30, wherein the graphical element is displayed at a vertical offset with respect to the addressable location, such that the graphical element is positioned between two lines of text and the insert text is displayed between two lines of text.

33. The article of manufacture of claim 30, wherein the computer program is further capable of causing the computer steps of:

receiving color input indicating a color in which to display the markings in the marking file; and displaying the graphical element in the color indicated in the color input, wherein the insert text appears in the color.

34. The article of manufacture of claim 33, wherein the selected marking file including the graphical element is a first marking file and the color is a first color, wherein the computer program is further capable of causing the computer steps of:

receiving selection of a second marking file including markings to the text in the document;

receiving color input indicating a second color in which to display the markings in the second marking file; and superimposing markings from the second marking file on text from the document.

35. The article of manufacture of claim 30, wherein the addressable location is a first addressable location, wherein the computer program is further capable of causing the computer the steps of:

receiving user input to move the graphical element to a second addressable location in the document;

displaying the graphical element as moving to the second addressable location, wherein the graphical element and insert text therein is displayed superimposed at the second addressable location;

receiving user input deselecting the graphical element; and displaying the return of the graphical element to the first addressable location.

* * * * *

UNITED STATES PATENT AND TRADEMARK OFFICE
CERTIFICATE OF CORRECTION

PATENT NO. : 6,567,830 B1
DATED : May 20, 2003
INVENTOR(S) : H. H. Maduri

It is certified that error appears in the above-identified patent and that said Letters Patent is hereby corrected as shown below:

<u>Column 17,</u>
Line 20, delete "comer" and insert -- corner --.

<u>Column 20,</u>
Line 50, delete "comer" and insert -- corner --.
Line 66, delete "marlding" and insert -- marking --.

Signed and Sealed this

Twenty-second Day of June, 2004

JON W. DUDAS
*Acting Director of the United States Patent and Trademark Office*